(12) United States Patent
Raith

(10) Patent No.: US 6,611,688 B1
(45) Date of Patent: Aug. 26, 2003

(54) POSITION REPORTING METHOD FOR A MOBILE TERMINAL IN A MOBILE COMMUNICATION NETWORK

(75) Inventor: Alex Krister Raith, San Diego, CA (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/510,431

(22) Filed: Feb. 22, 2000

(51) Int. Cl.$^7$ .................... H04Q 7/20; H04B 7/185
(52) U.S. Cl. ............... 455/456; 455/440; 455/441; 342/357.01; 342/357.07; 342/461; 340/992
(58) Field of Search ................. 455/456, 457, 455/440, 441, 418, 550; 701/300, 213; 342/357.01, 357.17, 457, 461; 340/991, 992, 993

(56) References Cited

U.S. PATENT DOCUMENTS

| | | | |
|---|---|---|---|
| 5,422,816 A | * 6/1995 | Sprague et al. | 455/575 |
| 5,491,835 A | * 2/1996 | Sasuta et al. | 455/34.1 |
| 5,546,445 A | 8/1996 | Dennison et al. | |
| 5,574,983 A | * 11/1996 | Douzono et al. | 455/69 |
| 5,669,061 A | 9/1997 | Schipper | |
| 5,959,577 A | 9/1999 | Fan et al. | 342/357.13 |
| 6,038,444 A | * 3/2000 | Schipper et al. | 455/421 |
| 6,052,598 A | * 4/2000 | Rudrapatna et al. | 455/456 |
| 6,061,561 A | * 5/2000 | Alanara et al. | 455/422 |
| 6,141,555 A | * 10/2000 | Sato | 455/437 |
| 6,199,045 B1 | * 3/2001 | Giniger et al. | 705/1 |
| 6,249,252 B1 | * 6/2001 | Dupray | 342/450 |
| 6,282,496 B1 | * 8/2001 | Chowdhary | 701/220 |
| 6,304,558 B1 | * 10/2001 | Mysore | 370/312 |
| 6,353,390 B1 | * 3/2002 | Beri et al. | 340/572.1 |
| 6,393,292 B1 | * 5/2002 | Lin | 455/456 |
| 6,442,392 B2 | * 8/2002 | Ruutu et al. | 455/456 |
| 6,473,422 B2 | * 10/2002 | Hall et al. | 370/352 |

FOREIGN PATENT DOCUMENTS

| EP | 0 631 451 A2 | 6/1994 | |
|---|---|---|---|
| GB | 2271486 A | 4/1994 | |
| WO | WO99/16276 | 4/1999 | |
| WO | WO 99/16276 | * 4/1999 | ............ H04Q/7/38 |

* cited by examiner

Primary Examiner—Duc Nguyen
(74) Attorney, Agent, or Firm—Coats & Bennett, P.L.L.C.

(57) ABSTRACT

A mobile terminal reports its position to the mobile communication network on a regular and unsolicited basis. Position reports are combined with data, such as channel quality measurements or packet data, that is otherwise being transmitted by the mobile terminal to the mobile communication network to reduce the number of access events and avoid collisions on shared channels. Position reports may give position as an absolute position, a relative position, or alternatively may be an indication of no change in position. Other position-related information, such as velocity and acceleration, may be included in position reports and used to vary the frequency of the position reports.

3 Claims, 5 Drawing Sheets

POSITION REPORTING METHOD FOR A MOBILE TERMINAL IN A MOBILE COMMUNICATION NETWORK

BACKGROUND OF THE INVENTION

The present invention relates generally to the management of mobile terminals in a mobile communication network and, more particularly, to a method for providing information to the mobile communication network about the position of mobile terminals.

In a mobile communication network, service areas are typically divided into a plurality of cells, with each cell served by a base station. Mobile terminals within a particular cell communicate over RF channels with the base station serving that cell. The base station may handle a plurality of simultaneous calls from mobile terminals. The base stations are connected with one another and to the Public Switched Telephone Network (PSTN) by a mobile services switching center (MSC). The MSC coordinates the activities of all the base stations and connects the mobile communication network to the PSTN. A typical MSC may handle 100,000 cellular subscribers and 5,000 simultaneous conversations at a time. The MSC also accommodates billing and system maintenance functions. In some higher density networks, several MSCs are used in a single network.

During the course of a call, the mobile terminal may move from one cell into another. A switching technique called a handover enables the call to proceed uninterrupted when the user moves between cells. When the mobile terminal moves into a different cell while a call is in progress, the MSC automatically transfers the call from the current channel being used to a new channel belonging to the base station serving the new cell.

Handover decisions are typically based on received radio signal strength and channel quality as monitored by the base station serving the mobile terminal. Received signal strengths are easily monitored and signal quality for any given channel is often determined by the bit error rate (BER) over a given channel. A handover from the current channel to another channel is initiated when the signal level or channel quality drops below acceptable levels and another channel is available that is capable of providing acceptable communications.

In digital mobile communication networks, it is common for the base stations to enlist the assistance of the mobile terminal to determine when a handover is required. In order to use a mobile terminal to assist handover, the serving base station downloads a list of channels, commonly referred to as a neighbor list, at the start of a call or after a handover. The neighbor list identifies channels in neighboring cells that are potential handover targets. In a mobile assisted handover (MAHO), each mobile terminal measures the received power from surrounding base stations identified by the neighbor list and continually reports the results of these measurements to the serving base station. The signal strength measurements are made by the mobile terminal in-between periods of communication during a call. For example, in Global System for Mobile Communications (GSM) systems, the frequency is divided into eight time slots. The mobile terminal is allocated one time slot for transmissions and another time slot to receive signals from the base station. During the remaining time slots, the mobile terminal is not communicating with the serving base station. The mobile terminal monitors channels belonging to neighboring base stations during these idle periods and then quickly returns to its assigned channels in time to transmit and receive signals in its allocated time slots. The measurements made by the mobile terminal of signals received from neighboring cells are reported back to the serving base station in a scheduled manner so as not to interfere with voice or data transmissions.

The measurement reports provided by the mobile terminal give the base station a list of the signal strength and possibly bit error rates from adjacent cells, as measured by the mobile terminal at its present location. The mobile communication network also knows which adjacent cells have unused radio channels that are available for allocation during a handover. From the list of available channels, the mobile communication network selects the cell which can best serve the mobile terminal and minimize interference. A suitable traffic channel in that cell is assigned as the target, and the mobile terminal is commanded to retune to the traffic channel in the target cell. At the same time, the call is switched by the MSC from the base station currently serving the mobile terminal to the base station in the target cell. The mobile terminal tunes to the newly assigned channel during one of the idle periods so there is no interruption in transmission. Thus, from the user's perspective, the handover can be made seamless.

In addition, many current mobile terminals include a positioning receiver, such as a Global Positioning System (GPS) receiver, for determining the location of the mobile terminal. In the existing art, the location of the mobile terminal, as derived from the positioning receiver, by mobile terminal and is not communicated to the mobile communication network. However, if the mobile communication network was provided with the location of the mobile terminal, the mobile communication network could use this information for a variety of purposes, such as to optimize handovers. Unfortunately, the present state of the art does not provide a sufficiently convenient and efficient method of conveying position information from a mobile terminal to the mobile communication network.

Thus, there remains a need for a convenient and efficient method of reporting the position of a mobile terminal to the mobile communication network, preferably one that minimizes bandwidth needed for such signaling. Also, for packet data communications, such a method should minimize the number of access events for transmissions by the mobile terminals to report their respective positions.

SUMMARY OF THE INVENTION

The present invention is a position reporting method implemented by a mobile terminal in a mobile communication network. The mobile terminal is equipped with a Global Positioning System (GPS) receiver or other position estimating device that enables the mobile terminal to determine its current location within a mobile communication network. The mobile terminal periodically generates an estimate of its current location, referred to herein as a position estimate, and transmits the position estimate to the mobile communication network.

In one embodiment of the invention, the position estimates are combined with control signals otherwise being transmitted from the mobile terminal to the mobile communication network. For example, in digital mobile communication networks, such as GSM systems, the mobile terminal periodically sends channel quality measurement (CQM) reports to the mobile communication network while the mobile terminal is engaged in a call. The CQM reports may include signal strength and channel quality measurements, such as BER, for channels in neighboring cells that are being monitored by the mobile terminal. According to the present invention, position information can be appended to or combined with the CQM report, or other reports sent on a regular basis, to minimize signaling overhead. Similarly, when the mobile terminal is engaged in a packet data session, position reports can be time multiplexed with packet data transmitted from the mobile terminal to the mobile communication network. By multiplexing the position information with packet data otherwise being transmitted, the number of access events is reduced and collisions resulting in access attempt failures forcing retransmissions are avoided.

The position reports may be sent by the mobile terminal on a regular and unsolicited basis. Alternatively, some predetermined decision or reporting criteria can be employed to trigger the sending of a position report. For example, the mobile terminal can be programmed to transmit a position report when the difference between the current position of the mobile terminal and a previously reported position exceeds a predetermined threshold. The frequency of reporting can then be varied by the network operator by specifying the distance between reports or an explicit transmission frequency.

In another aspect of the invention, position reports may also include other information derived from position, such as the velocity, speed, direction or acceleration of the mobile terminal. A velocity estimate may be sent by the mobile terminal when the change in velocity of the mobile terminal exceeds a predetermined threshold or other reporting criteria. The velocity of the mobile terminal can be used to determine the reporting interval between consecutive position reports by the mobile communication network or by the mobile terminal. By using the velocity to determine the interval between position reports, a mobile terminal traveling at a higher speed will send position reports more frequently than a mobile terminal traveling at a lesser speed. The reporting interval can be determined by either the mobile terminal or by the mobile communication network. Velocity, speed and/or direction can also be used by the mobile communication network to interpolate the position of the mobile terminal between position reports.

The position reports transmitted by the mobile terminal may be in one of several formats. One type of position report would give an absolute position (e.g., such as a coordinate position), that can be interpreted by the mobile communication network without resort to previously-received data. Alternatively, the position report may give a relative position. A relative position is a position expressed as a function of a previously-reported position. The referenced position referred to by a relative position may, itself, be a relative position. Another type of position report is a "no-change" report. A no-change report indicates to the mobile communication network that the mobile terminal has not changed position beyond predefined limits. An indication of "no-change" can be given by omitting position data that otherwise would be transmitted in a message. Lastly, position of the mobile terminal can be implied by formatting data otherwise being transmitted in a predetermined manner. One example of implied position is to transmit channel quality measurements in order of distance. The order of the measurements would then give some indication of the relative location of the mobile terminal.

DETAILED DESCRIPTION OF THE INVENTION

Figure 1:
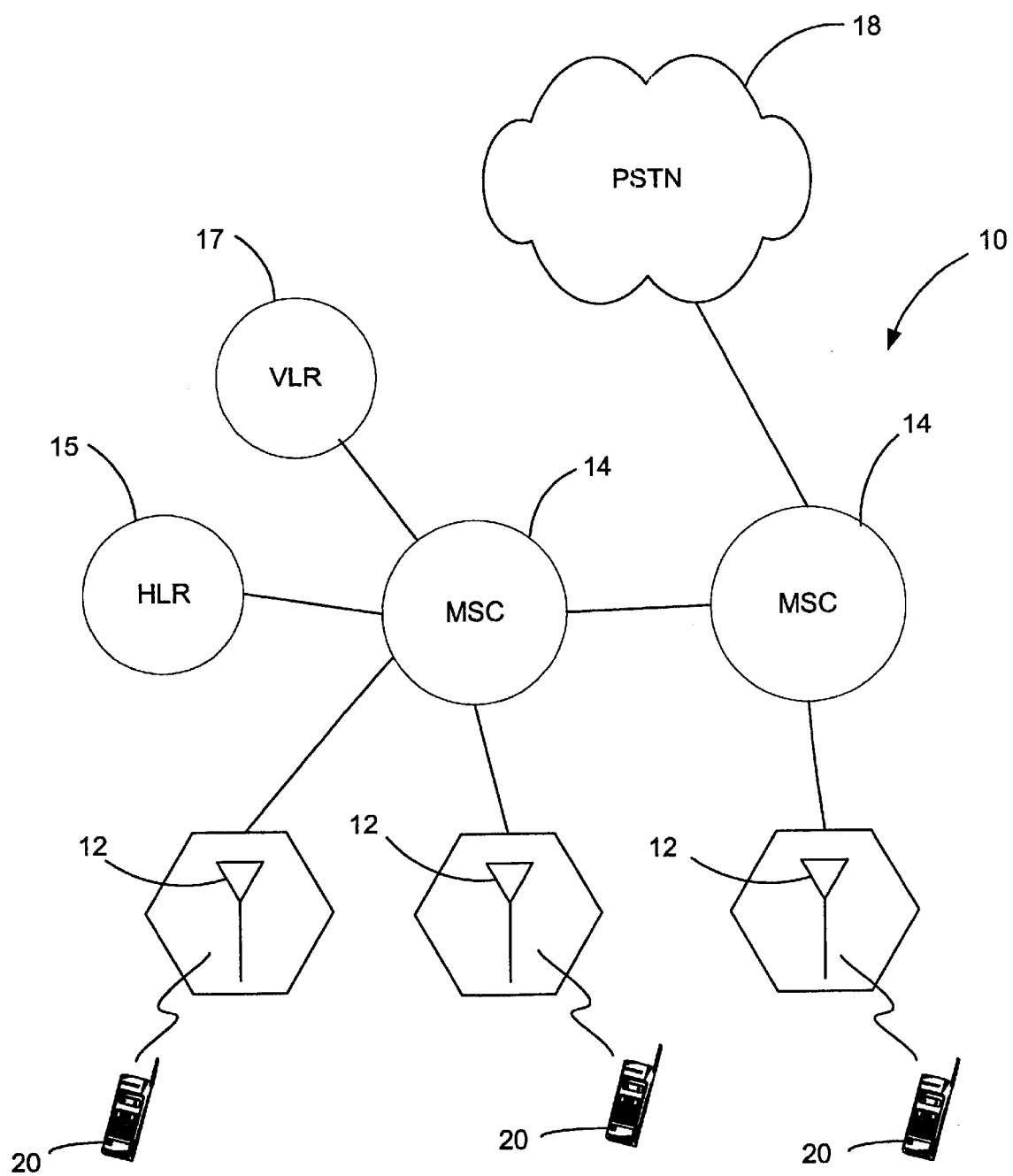
FIG. 1 is a schematic diagram of a mobile communication network.

FIG. 1 is a schematic diagram illustrating the basic elements of a mobile communication network, which is indicated generally by the numeral 10. The mobile communication network 10 comprises a plurality of base stations 12 which are connected via a mobile services switching center (MSC) 14 to a terrestrial communications network, such as the Public Switched Telephone Network (PSTN) 18. Each base station 12 is located in, and provides service to, a geographic region referred to as a cell. In general, there is one base station 12 for each cell within a given mobile communication network 10. Within each cell, there may be a plurality of mobile terminals 20 that communicate via radio link with the base station 12. The base station 12 allows the users of the mobile terminals 20 to communicate with other mobile terminals 20, or with users connected to the PSTN 18. The mobile services switching center (MSC) 14 routes calls to and from the mobile terminal 20 through the appropriate base station 12. Information concerning the location and activity status of mobile terminals 20 is stored in a Home Location Register (HLR) 15 and a Visitor Location Register (VLR) 17, which are connected to the MSCs 14.

Figure 2:
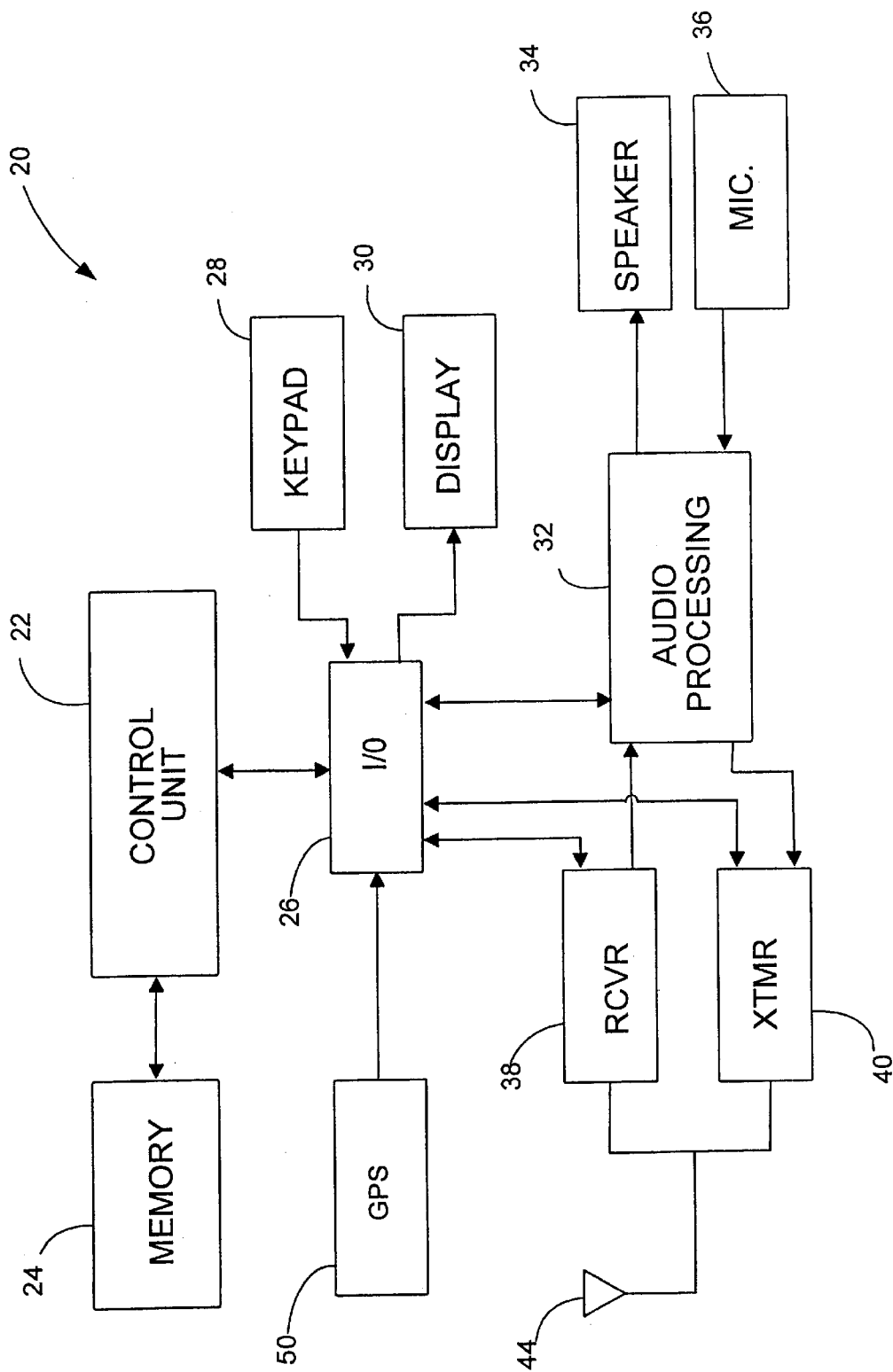
FIG. 2 is a block diagram of a mobile terminal in the mobile communications network of FIG. 1 that implements the position reporting method of the present invention.

FIG. 2 is a block diagram of a typical mobile terminal 20. The disclosed embodiment of the mobile terminal 20 is a fully functional cellular telephone, such as a IS-95 compliant cellular telephone, capable of transmitting and receiving analog and/or digital signals over an RF channel. The mobile terminal 20 includes a main control unit 22 for controlling the operation of the mobile terminal 20 and memory 24 for storing control programs and data used by the mobile terminal 20 during operation. Input/output circuits 26 interface the control unit 22 with a keypad 28, display 30, audio processing circuits 32, receiver 38, transmitter 40, and positioning receiver 50. The keypad 28 allows the operator to dial numbers, enter commands, and select options. The display 30 allows the operator to see dialed digits, stored information, and call status information. The audio processing circuits 32 provide basic analog audio outputs to a speaker 34 and accept analog audio inputs from a microphone 36. The receiver 38 and transmitter 40 receive and transmit signals using shared antenna 44.

The positioning receiver 50 enables the mobile terminal 20 to determine its current location based on positioning signals transmitted by an earth-orbiting satellite transmitter or terrestrial-based transmitter. For example, the positioning receiver could be a Global Positioning System (GPS) receiver. Positioning receivers, such as the GPS receiver, are well-known in the art and the details of how they operate are not germane to the present invention. All that is necessary to the proper understanding of the invention is that the mobile terminal 20 be able to determine its location from a signal received by the positioning receiver 50.

The present invention provides a position reporting method implemented in a mobile terminal 20 for reporting its position to the mobile communication network 10. Position reports transmitted by the mobile terminal 20 may include processed position data, or alternatively, may include raw position data requiring additional processing once received by the mobile communication network 10. The mobile communication network 10 may use position information provided by the mobile terminal 20 for a variety of purposes. For example, position and velocity of the mobile terminal 20 may be used to help determine the optimum time for a handover while the mobile terminal 20 is engaged a call. The mobile communication network 10 may also use position information to determine which channels to include in the neighbor list transmitted to the mobile terminal 20, to determine the route traveled by the mobile terminal 20, and to determine the optimum location along a route at which to execute the handover. These examples are not exclusive, but instead are intended to illustrate the many different types of applications that may be enhanced by using position information.

According to a preferred embodiment of the invention, position reports are sent by the mobile terminal 20 to the mobile communication network 10 on a regular and unsolicited basis. The position reports transmitted by the mobile terminal 20 to the mobile communication network 10 may be in a variety of different formats, depending on the type of position information being sent. The four basic types of position information are referred to herein as absolute position, relative position, no change of position, and implied position. The mobile terminal 20 may use one or more of these basic types of position information to report its position to the mobile communication network 10.

An absolute position is a position that can be interpreted by the mobile communication network 10 without resort to previously received data from the mobile terminal 20. An example of an absolute position would be a set of coordinates referenced to a known coordinate system. The known coordinate system may be a standard coordinate system, such as the GPS coordinate system, which provides for unambiguous interpretation of position worldwide. Alternatively, the absolute position may be referenced to a known location within the mobile communication network 10, such as the coordinate location of the serving base station 12. In this case, the mobile terminal 20 would acquire the coordinate position of the reference location from the base station 12 when it registers with the mobile communication network 10. The coordinate position of the reference location may be transmitted to the mobile terminal 20 on either a broadcast channel or a point-to-point channel.

A relative position is reported with respect to a previously reported position. When formatting a position report, the mobile terminal 20 determines the difference between its current position and some previously reported position(s) and transmits the difference to the mobile communication network 10. In the case of a relative position, the position report may include a reference to the previously transmitted position report which is referenced by the relative position. A relative position may have multiple levels of dependencies. That is, the relative position references a previously reported position which is also a relative position. In this case, the chain of dependencies ultimately leads back to an absolute position that was previously transmitted.

No change of position means that the mobile terminal 20 has not moved beyond a predetermined threshold from a previously reported position. The threshold may be expressed as a range (e.g. distance from the last reported position) or an area. As long as the mobile terminal 20 has not traveled beyond the specified range or area, the mobile terminal 20 may send a no change indication, which may be a single bit. A no change indication can also be given by omitting position information that would otherwise be present within a given message or message set. In one embodiment of the invention, the position information is multiplexed with other information that is sent to the mobile communication network 10 on a regular and unsolicited basis, such as channel quality measurements that are made periodically by the mobile terminal 20. In this case, the absence of position information in the message containing channel quality measurements provides a means to reliably indicate to the mobile communication network 10 that there is no change in position of the mobile terminal 20 without sending an explicit indication to the mobile communication network 10. By piggybacking position information, the amount of signaling overhead and, thus, the required bandwidth for position reporting is significantly reduced.

An implied position is position information that is implied from other information transmitted by the mobile terminal 20 to the mobile communication network 10. For example, in mobile communication networks 10 that employ mobile assisted handovers, a neighbor list is provided by the serving base station 12 to the mobile terminal 20 during call set up or after a handover. The mobile terminal 20 periodically takes measurements of signals on channels identified in the neighbor list and reports these channel quality measurements to the mobile communication network 10. The mobile terminal 20 can indicate its relative position by transmitting measurement reports in order from the closest to the furthest. It should be noted that the closest station may not always provide the strongest signal. Thus, the order of the channel quality measurements gives the mobile communication network 10 some information about the position of the mobile terminal 20 without consuming any bandwidth.

In a preferred embodiment of the invention, the position information is multiplexed or combined with information that is otherwise being transmitted to the mobile communication network 10 to reduce signaling overhead and bandwidth requirements for position reporting. For example, in GSM and other Time Division Multiple Access (TDMA) systems, the mobile terminal 20 periodically sends channel quality measurement reports to the base station 12. In existing mobile communication networks, the channel quality measurement report is sent approximately once per second. If position data is required with a similar reporting frequency, or some integer multiple thereof, the position information and channel quality measurements can be combined into a single message or set of messages to piggyback onto existing message overhead. If position reporting is not done regularly, but instead is event triggered, multiplexing with channel quality measurements is still possible due to the frequency of the channel quality measurement reports. In the case of event triggered position reporting, the mobile terminal 20 can combine the position information with channel quality measurements in the next reporting period. Since channel quality measurement reports are sent once every second, any delay in receiving the position information would likely be within acceptable limits.

Figure 3:
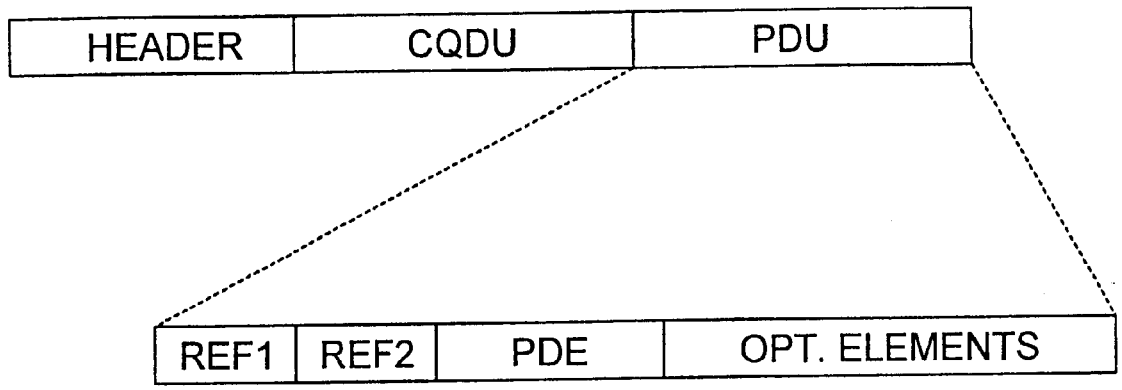
FIG. 3 is a diagram of a combined channel quality measurement and position report used by the present invention.

FIG. 3 is a diagram illustrating the format of the combined channel quality measurement (CQM) and position data (PD) report used in the present invention. The CQM/PD comprises a header including information specified by the protocol being used. Following the header is a channel quality data unit (CQDU) which includes channel quality measurements being reported. A position data unit (PDU) follows the CQDU. The PDU includes position information that is reported by the mobile terminal 20 to the base station 12. By way of example, the PDU may include two reference identifier information elements, labeled REF 1 and REF 2 in the drawings. The first reference identifier, REF 1, is used to uniquely identify the PDU that is currently being transmitted. The second reference identifier, REF 2, is used to reference a PDU that was previously transmitted. For example, REF 2 would be used for transmitting a relative position that references a previously-reported position. If the protocol does not support reference by a relative position to a previously transmitted relative position, REF1 may be omitted. The reference identifier fields are followed by a position data element (PDE) which may comprise one or more fields. The PDE would include the position information that identifies the current location of the mobile terminal 20, such as a set of coordinates or a vector. The position data element is followed by optional information elements, which may include, for example, the current velocity of the mobile terminal 20, the change in velocity, speed, direction, acceleration, or other position-related information.

The particular format of the PDE may depend on the type of position information transmitted and optional elements that are transmitted. In the case of an absolute position, the PDE would include fields for position information, such as a set of coordinates. Alternatively, absolute position could be expressed in a vector format by giving the distance and direction from a reference point known to the mobile communication network 10. The position data unit could also include other information, such as the velocity and acceleration of the mobile terminal 20 in the optional information elements. Also, a report containing absolute position information that may be followed by reports containing relative information may include a reference identifier (e.g., time, sequence number). Subsequent reports containing relative position information would then include the same reference identifier.

A report containing relative position information would, as stated above, include a reference identifier that references a previously reported position. The relative report may also include its own reference identifier that is used by subsequent reports containing relative information to reference the relative position report, thereby creating a chain of dependencies. In addition to the reference identifiers, the relative position report would typically include fields containing the distance and direction from the previously reported position.

There are a variety of ways in which a no change of position indication can be given. A no change of position indication is typically given when the mobile terminal 20 has not moved beyond a predetermined threshold, which may be expressed either as a range or distance from a previously reported position or a specified area. A no change of position indication can be given by transmitting a single bit, contained in the PDE, from the mobile terminal 20 to the mobile communication network 10. Another method is to omit the position data unit from the combined message. The absence of the position data unit could be used to indicate to the mobile communication network 10 that there is no change of position. Either of these two methods would significantly reduce the amount of bandwidth required to report position. Another method for giving a no change indication is to assign n bits of information to the position reporting and divide the threshold by $2^n$ creating $2^n$ segments out of the threshold. The value m in the position report could then indicate that the mobile has traveled m segments. A further refinement is to include the direction of travel.

In a conventional cellular communication network, the channel quality measurement reports are typically not acknowledged by the mobile communication network. In current mobile communication networks 10, the lack of acknowledgement and retransmission of lost messages is not an issue because the channel quality measurements are not interdependent. However, relative reporting of position creates an interdependency between the message containing absolute position information and all subsequent relative reports that trace back to that absolute position. If the message with absolute position information is not received, the following messages with relative information cannot be interpreted, or will be interpreted incorrectly. To avoid this problem, the reporting protocol can be modified to require an acknowledgement from the mobile communication network 10 whenever an absolute position is reported. If no acknowledgement is received, the mobile terminal 20 then re-sends a message containing the absolute position, possibly with updated position information.

Another potential problem arises when the mobile terminal 20 reports its position relative to the location of the currently serving base station 12. A handover occurs whenever the mobile terminal 20 moves from one cell into another. During the handover process, a logical reference for relative reporting can be maintained by including the position of the target base station 12 in the handover command. Alternatively, the position of base stations 12 in neighboring cells can be included in the neighbor list which is sent on the broadcast channel and used by the mobile terminal 20 to select the best cell while in idle mode. This latter method avoids the need to include position information for the base station 12 in the handover command.

Figure 4:
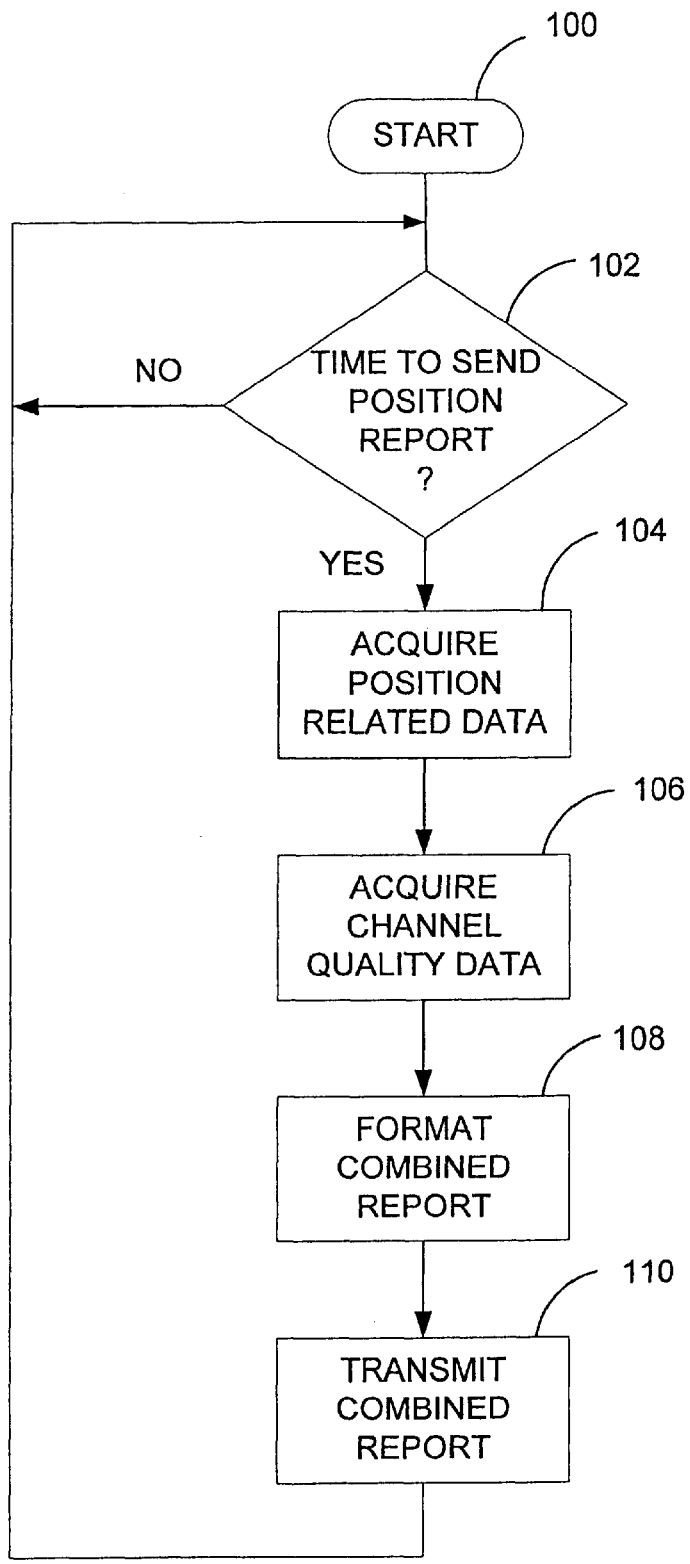
FIG. 4 is a flow diagram illustrating one embodiment of the operation of the mobile terminal according to the present invention.

FIG. 4 illustrates an exemplary process of sending a combined channel quality measurement and position report from the mobile terminal 20 to the mobile communication network 10. Depending on the specific technology (e.g., GSM, ANSI-95, and TIA/EIA-136), the combined report may be sent with a predetermined frequency.

As shown in FIG. 4, once position reporting is enabled (block 100), the mobile terminal 20 continuously monitors a timer to determine whether it is time to send a position report (block 102). If not, the mobile terminal 20 continues to monitor the timer. When the timer indicates that a position report should be sent, position-related data is acquired from the position reporting task (block 104) and channel quality data is acquired from the channel quality task (block 106). The position-related data and channel quality data are then combined and formatted into a combined report (block 108). The format of the combined report may depend on the type of position information transmitted as previously described. After formatting the report, the report is transmitted to the base station 12 (block 110). This process repeats until position reporting is disabled.

When the phone is engaged in a packet data session, using for example the General Packet Radio Service (GPRS) protocol, channel quality measurements are typically not transmitted. Thus, there are no regular messages on which to piggyback position reports. During the packet data session, the mobile terminal 20 typically handles the cell reselection process itself by monitoring the signal strength and/or channel quality of channels in the adjacent cells. Unlike the situation where the mobile terminal 20 is actively engaged in a circuit-switched call, a mobile terminal 20 engaged in a packet data session transmits relatively infrequently. When the mobile terminal 20 does transmit, it transmits on a packet data channel that is shared with other mobile terminals 20. Sending the channel quality measurements during the packet data session uses bandwidth that could otherwise be used for data transmissions by other stations.

Transmitting position reports independently of other messages on a regular and unsolicited basis would also increase the number of collisions. The packet data channel used by the mobile terminal 20 is shared with other mobile terminals 20. When the mobile terminal 20 transmits, it contends with other mobile terminals 20 for "possession" of the channel and collisions may occur. Although the GPRS protocol will recover from collisions, each access attempt requires more bandwidth capacity compared to the marginal capacity used once the channel is "owned" by a particular mobile terminal 20. Typically, once the mobile terminal 20 has acquired the right to the channel, the mobile terminal 20 operates in reserved mode until it relinquishes the uplink channel resource. This is a more effective channel utilization than to continuously contend for the resource.

Attempting to transmit position reports on a regular and unsolicited basis on the packet data channel would dramatically increase the number of access events and, hence, the number of collisions. Thus, in packet data mode, the mobile terminal 20 of the present invention takes advantage of other access events to piggyback position information. An access event may occur when the mobile terminal 20 transmits user data to the base station 12 or when the mobile terminal 20 transmits a lower level acknowledgement of down-link data segments. The mobile terminal 20 uses these types of opportunities to piggyback the position report. By bundling multiple messages into a single transmission event, the number of channel access attempts and collisions is significantly reduced.

During the packet data session, there are numerous tasks that need to be performed that require the mobile terminal 20 to transmit control messages to the base station 12. One such task is authentication. Additionally, the mobile terminal 20 transmits when it sends user data to the base station 12. The position report can be piggybacked to any of these transmission events.

Figure 5:
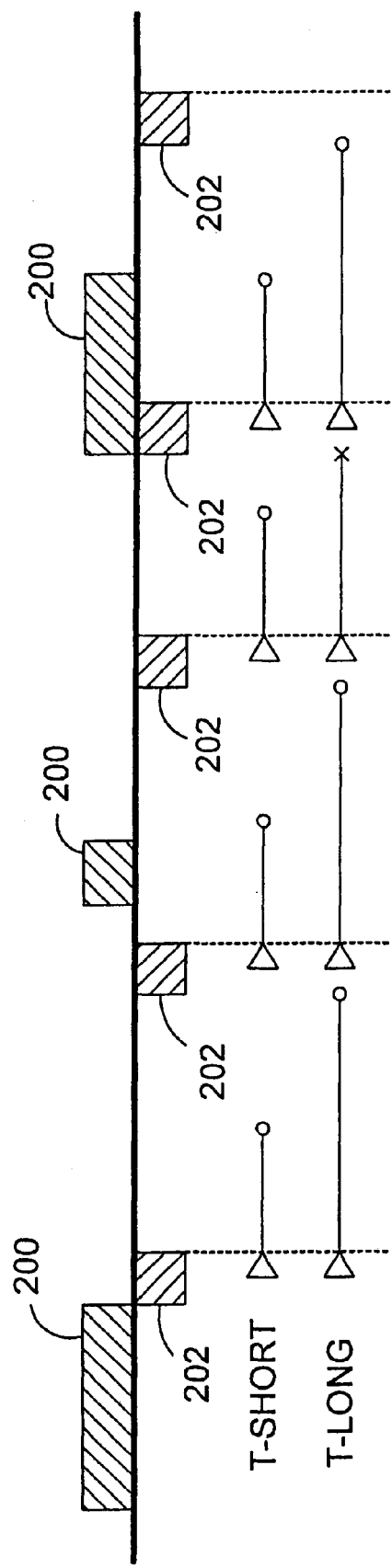
FIG. 5 is a timeline illustrating position reporting during a packet data session.

FIG. 5 is a timeline illustrating an exemplary procedure for transmitting a position report in packet data mode. Blocks 200 above the timeline represent uplink activity other than position reporting. Blocks 202 below the timeline represent transmission of position data. Two timers, called T-short and T-long, are set whenever a position report is transmitted by the mobile terminal 20 to the mobile communication network 10. The initial values for the timers T-long and T-short can be preprogrammed or transmitted to the mobile terminals 20, for example, on a broadcast channel. The initial value of T-long is set to a higher value (longer duration) than T-short. If a transmission event, other than a position report, occurs after timer T-short has expired, a position report is piggybacked with the control data or user data being transmitted. If the data communication protocol being used does not require the mobile terminal 20 to specify length in the first packet, the decision whether to piggyback a position report can be made while the mobile terminal 20 is still granted the channel, i.e., after the transmission event begins. If the timer T-long expires without a transmission event occurring, a dedicated access attempt for position reporting is made. In both cases, the timers T-short and T-long are both reset upon completing the transaction including the position report. This exemplary protocol constitutes a compromise between regular and frequent reports and minimizing the number of dedicated channel access attempts for position reporting. In particular, it is noted that the mobile terminal 20 does not transmit position information until timer T-short expires. Thus, the timer T-short avoids unnecessary frequent reporting.

A more aggressive scheme is to start the timers when the transmission of the position report is started, since this better reflects the time of the reported position estimate. There is no major difference between the two schemes if the following conditions are satisfied: there is a good radio link, the mobile communication network 10 is not putting the mobile terminal 20 on hold to service requests from other mobile terminals 20, and the frequency of reporting is not extremely high.

In another aspect of the invention, additional information, such as the velocity, speed, direction, or acceleration of the mobile terminal 20, can be sent from the mobile terminal 20 to the base station 12 along with position information. Velocity, speed, and/or direction can be used by the mobile communication network 10, for example, to reduce the number of position reports. That is, rather than having all mobile terminals 20 transmit with the same periodic interval, the reporting interval can be varied based on the velocity of the mobile terminal 20. The reporting interval may be determined by either the mobile terminal 20 or by the mobile communication network 10. Alternatively, the reporting interval may be downloaded over the air from the base station 12 using the Over-the-Air Programming Teleservice (OPTS). For example, the mobile terminal 20 can generate an estimate of its velocity based on its reported positions over time. The mobile terminal 20 can then vary the reporting intervals inversely in proportion to the speed of travel. The mobile communication network 10 can use the velocity estimate to interpolate the expected position of the mobile terminal 20 in-between position reports. The velocity estimate can also be calculated at the mobile communication network 10, rather than at the mobile terminal 20. In this case, the mobile communication network 10 would then send a command to the mobile terminal 20 to change the frequency of its reporting or implied in the protocol.

Similarly, the mobile terminal 20 may vary the frequency of position reporting based on sudden changes in velocity or acceleration. For example, assume that the mobile terminal 20 has remained at the same location for a long period of time. In this case, position reporting could be suspended while the mobile terminal 20 is stationary. Thereafter, when the mobile terminal 20 begins to move, the change in velocity or acceleration of the mobile terminal 20 can be used by the mobile terminal 20 to begin position reporting. By suspending position reporting when the mobile terminal 20 is stationary, bandwidth is conserved. Sudden deceleration can also be reported by the mobile terminal 20. Sudden deceleration may indicate occurrence of an accident. The sudden deceleration of the mobile terminal 20 may be reported along with the current position of the mobile terminal 20. The mobile communication network 10 may then notify emergency response authorities in the area so that emergency personnel can be immediately deployed.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method for reporting a position of a mobile terminal to a mobile communication network during a packet data session, said method comprising:

starting a packet data session;

transmitting packet data to said mobile communication network during said packet data session;

determining said position of said mobile terminal;

sending position information representative of said position of said mobile terminal to said mobile communication network by multiplexing said position information with packet data otherwise being transmitted during said packet data session;

setting first and second timers, wherein said second timer is set to expire subsequent to said first timer;

waiting for an access event following expiration of said first timer; and if an access event occurs after said first timer expires and before said second timer expires, sending said position information representative of said position information of said mobile terminal during said access event.

2. The method according to claim 1 further including sending said position information representative of said position of said mobile terminal after said second timer expires if no access event occurs between expiration of said first and second timers.

3. A method for reporting a position of a mobile terminal to a mobile communication network during a packet data session, said method comprising:

starting a packet data session;

transmitting packet data to said mobile communication network during said packet data session;

determining said position of said mobile terminal; and thereafter, sending position information representative of said position of said mobile terminal to said mobile communication network by bundling said position information with packet data otherwise being transmitted during said packet data session into a single transmission event;

wherein said sending position information comprises:
  waiting to send said position information to said mobile communication network until there exists other packet data to be transmitted from said mobile terminal to said mobile communication network;
  bundling said position information with said other packet data to produce a combined message;
  transmitting said combined message as a single transmission event during said packet data session;

setting first and second timers, wherein said second timer is set to expire subsequent to said first timer, and wherein said waiting comprises waiting for an access event following expiration of said first timer.

* * * * *